United States Patent [19]
Fudalla

[11] Patent Number: 5,148,953
[45] Date of Patent: Sep. 22, 1992

[54] DEVICE FOR THE APPORTIONED DELIVERY OF LIQUIDS

[75] Inventor: Manfred Fudalla, Leer, Fed. Rep. of Germany

[73] Assignee: Weener-Plastik GmbH & Co. KG, Weener/Ems, Fed. Rep. of Germany

[21] Appl. No.: 655,729

[22] Filed: Feb. 14, 1991

[30] Foreign Application Priority Data

Mar. 17, 1990 [DE] Fed. Rep. of Germany ....... 4008645

[51] Int. Cl.$^5$ ............................................. G01F 11/28
[52] U.S. Cl. ..................................... 222/442; 222/455
[58] Field of Search ............... 222/129, 424, 441, 442, 222/454, 455, 456

[56] References Cited

U.S. PATENT DOCUMENTS

| | | | |
|---|---|---|---|
| 1,687,705 | 10/1928 | Androff | 222/424 |
| 2,714,977 | 8/1955 | Davis | 222/424.5 |
| 2,977,028 | 3/1961 | Joffe | 222/442 |
| 4,061,253 | 12/1977 | Rockefeller | 222/442 |
| 4,151,934 | 5/1979 | Saeki | 222/455 X |
| 4,582,230 | 4/1986 | Vienkötter | 222/442 |
| 4,614,285 | 9/1986 | Fudalla et al. | 222/455 X |
| 5,020,699 | 6/1991 | Sams | 222/442 X |
| 5,029,736 | 7/1991 | Maruyama et al. | 222/456 X |

FOREIGN PATENT DOCUMENTS 0132628 2/1985 European Pat. Off. ............ 222/455

Primary Examiner—Kevin P. Shaver
Assistant Examiner—Joseph A. Kaufman
Attorney, Agent, or Firm—Martin A. Farber

[57] ABSTRACT

A device for the apportioned delivery of liquid (3) from a storage container (2) through an outlet tube (20) which enters into the low position, the delivery taking place only upon the second turning over the device. A cup-shaped housing (5) is divided by a partition wall (16) into an upper chamber (I) and a lower discharge chamber (II), the discharge chamber (II) and upper chamber (I) of the housing being connected to each other by a passage hole (17), and a feed opening (33) is formed in the upper chamber (I). An outlet tube (20) debouches above the partition wall (16), and an air passage is formed in the region of the upper chamber (I). In order to obtain a more advantageous development from a manufacturing standpoint while retaining or possibly even increasing the accuracy of dosaging, the outlet tube (20) is attached to the upper chamber (I) and the discharge chamber (II) is attached by detent to the upper chamber (I).

12 Claims, 7 Drawing Sheets

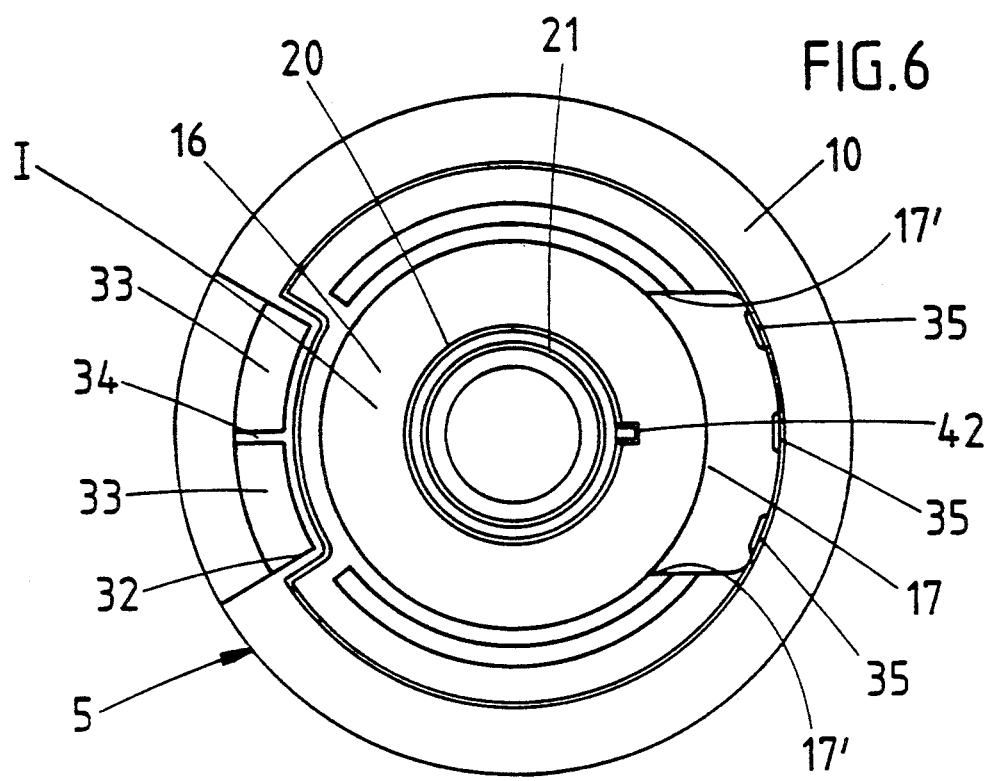
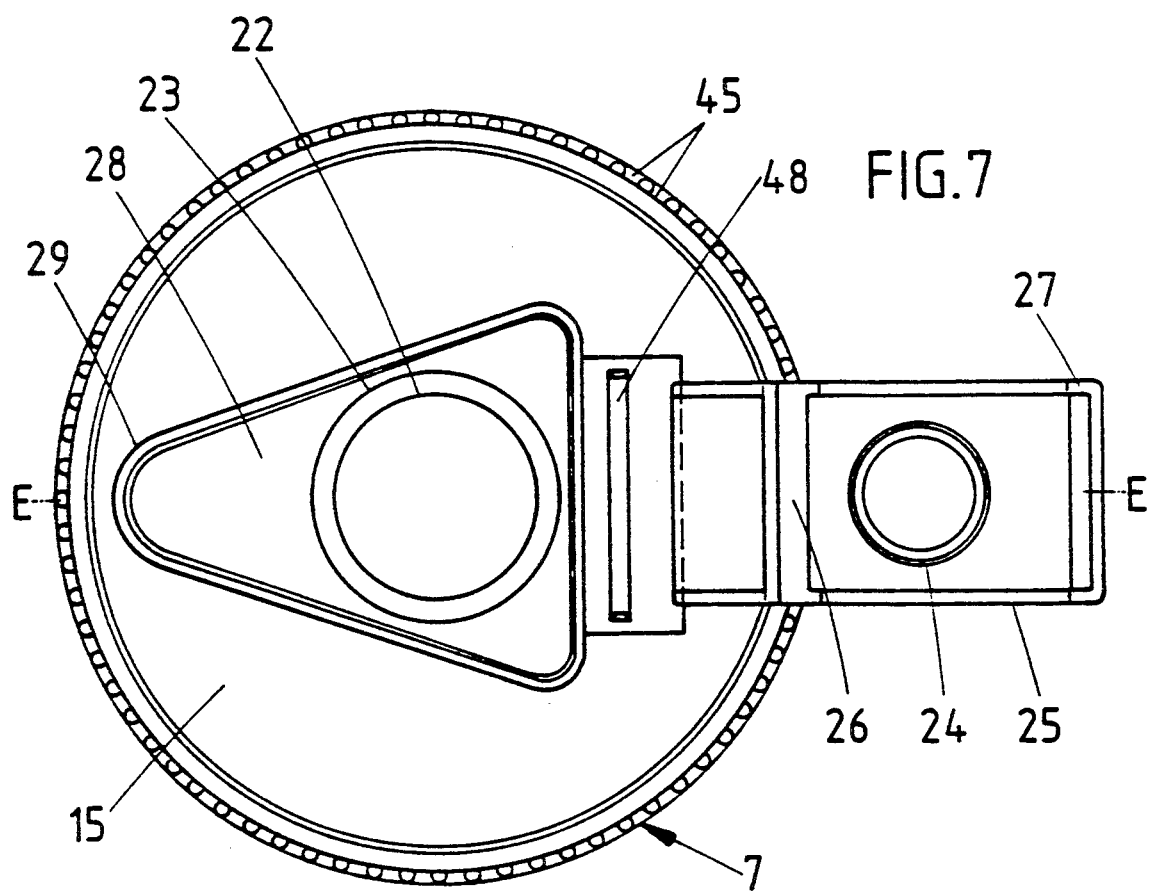

DEVICE FOR THE APPORTIONED DELIVERY OF LIQUIDS

FIELD AND BACKGROUND OF THE INVENTION

The present invention refers to a device for the apportioned delivery of liquids.

A device of this type is known from EP Patent 0 132 628 (and the parallel U.S. Pat. No. 4,614,285). In that case, the apportioned delivery is effected through an outlet tube in a low position; it takes place only upon turning the device upside down for the second time. For this purpose, the device, formed by a cup-shaped housing, is divided by a substantially, transversely extending partition wall into an upper chamber and a lower. The delivery chamber and the upper chamber are connected to each other by a passage opening. The filling is effected via a feed opening in the upper chamber. The outlet tube terminates above the partition wall. An air passage is furthermore formed in the upper chamber. The outlet tube extends close to the bottom of a beaker which surrounds the discharge chamber, leaving the necessary flow path. This leads to the existence of a double wall and thus an increase in the expense of the device which is conceived of as a typical mass production article. The injection mold is also relatively complicated.

SUMMARY OF THE INVENTION

The object of the present invention is to develop a device of this type which is more advantageous from a manufacturing standpoint while retaining, or even increasing, the precision of the dosaging.

As a result of the invention there is obtained a solution which, in particular, is more favorable for manufacture. The expense for material can be substantially reduced; such a saving is today again definitely of interest. Specifically, the invention proposes that the outlet tube be attached to the upper chamber and that the discharge chamber be attached by detent to the upper chamber. Except for the small overlapping zone of the detent attachment, the presence of a double wall is avoided. The corresponding bipartite character, furthermore, however, also has advantages with regard to the injection molding process. The accessibility, in opposite directions of the cores also permits an optimal structure from a standpoint of flow. Furthermore, recourse may even be had to different materials, for instance, in the manner that the need for the sealing of the part which is insertable into the mouth of a storage container, namely, the housing, is taken better into consideration, for instance in the manner that said part is of softer development than, for example, the beaker which forms the discharge chamber or, conversely, that the supplementary parts of the device to be attached to the housing are made softer than the housing. As to the separately produced beaker, certain special shapes can be better obtained. On the other hand, however, the discharge chamber can even be omitted in certain cases so that the device permits the dispensing of an uninterrupted jet instead of a dosaged amount which is in each case dependent on tilting. As to the detent attachment, any attachment of similar type, such as, for instance, hammering on is also understood thereby. Furthermore, the invention proposes that the outlet tube be formed in one piece with the upper chamber. This also furthers the goal of saving material. In addition, a stable transition is obtained in the region of connection between the outlet tube and the housing of the device. It is furthermore, advantageous for vent holes to be formed in the side wall of the upper chamber. The vent holes, several of which are provided, avoid any weakening of the side wall. Due to the fact that, furthermore, the vent holes are located at the mid-height of the side wall of the upper chamber, rapid flooding is obtained with evacuation of the air. Another feature of the invention is that three vent holes are located alongside of each other. Alongside of each other means at the same height as well as lying in the region alongside the theoretical plane of tipping. As a result, no precise maintaining of said plane is required. It is furthermore advantageous to form a feed channel leading to the feed openings by an inward bulge of the side wall of the upper chamber cooperating with a neck of the storage container. The corresponding inward bulge can readily be taken into consideration upon molding since it is open towards the outside and extends substantially along the axis of the cup-shaped housing. The cup can in this connection rest, at least partially, against the neck or else extend radially spaced by a slot from it. In the last-mentioned case, lateral feed regions to the actual feed channel are present, in this case also to support the advantage of not having to operate precisely in the theoretical tilting plane of the device. In addition, in accordance with another feature of the invention the feed openings debouch in a plane which is formed by the upper edge of the upper chamber. In this way, feed openings and vent holes are spaced axially rather far apart; feed openings and vent holes ordinarily lie on diametrically opposite sides. Furthermore, it is favorable for the cover of the upper chamber to be formed by a screw cap which is passed through by the outlet tube with tight application. The multi-partite character which is present also in this way makes it possible to satisfy sealing requirements in a particularly favorable form in the manner that the one part is made correspondingly "softer". The sealing application can in this case also be obtained by impact. Furthermore, in accordance with another feature of the invention orientation projection can be arranged on the outlet tube for cooperation with an orientation recess in the screw cap. This has advantages from an assembly standpoint, particularly with regard to tool free attachment of the parts to each other. Concretely, the orientation projection may suitably be an axially extending orientation tongue. The latter can extend practically over the entire length of the outlet tube. In this connection, it acts at the same time as a stabilizing rib. Furthermore, by providing a rather long orientation tongue, an early alignment of screw cap and housing can already take place.

BRIEF DESCRIPTION OF THE DRAWINGS

The object of the invention is described in further detail below with reference to an embodiment shown in the drawing, in which

FIG. 6 is a top view of the cup-shaped housing of the device;

FIG. 7 is a top view of the screw cap of the device, the closure tab being open;

DETAILED DESCRIPTION OF THE PREFERRED EMBODIMENT

Figure 1:
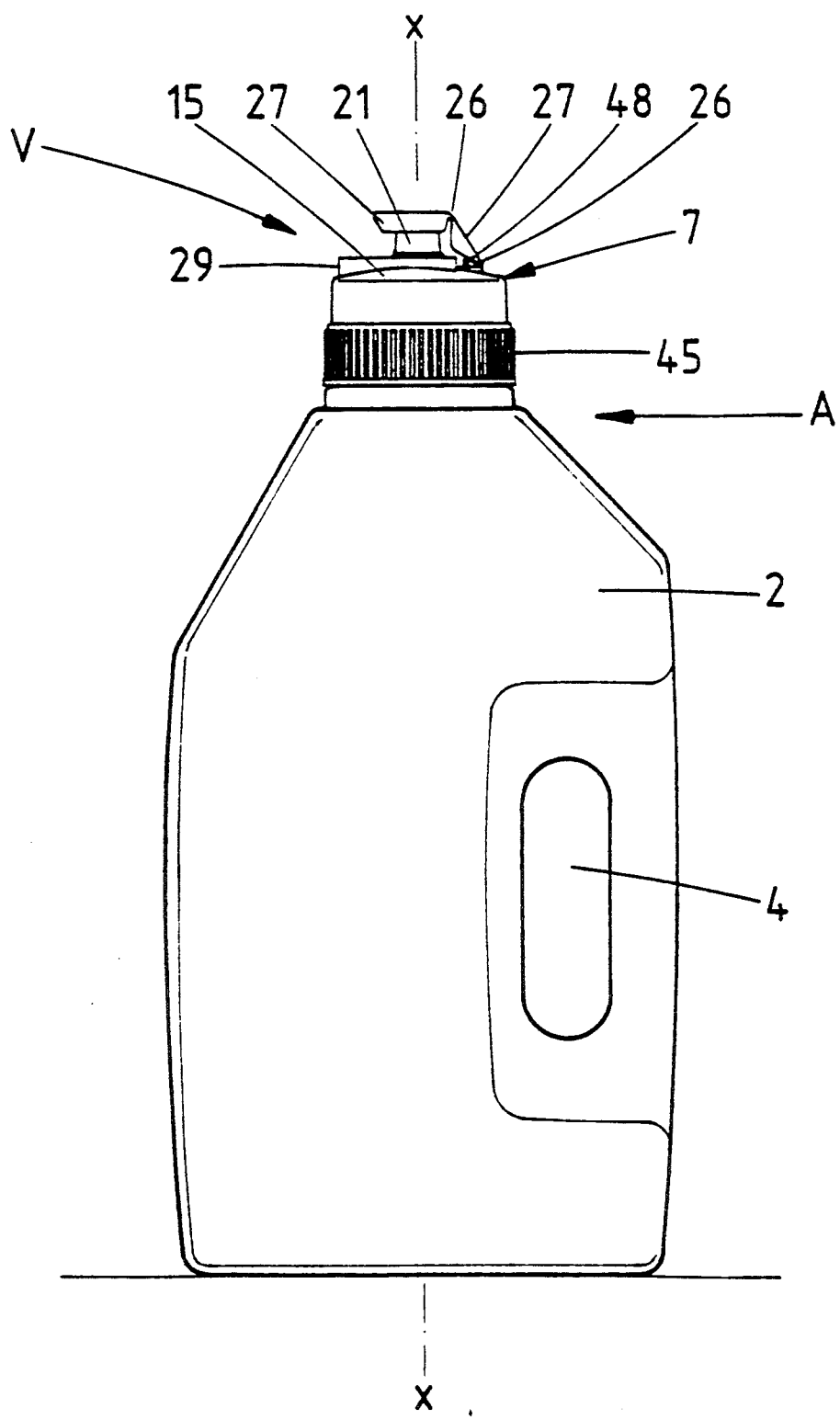
FIG. 1 shows the device of the invention on a liquid-containing storage container, seen in side view.

The device V of the invention is placed onto the neck 1 of a storage container 2. The liquid which is to be dispensed therefrom in dosaged quantities bears the reference numeral 3.

The storage container 2 forms a grip cavity 4. The latter is located outside the longitudinal central axis x—x of the device V and thus results positively in maintaining a given direction of tilt of the unit. The corresponding pouring plane coincides with the course of the section in FIG. 4 and is designated E—E in FIG. 7. The lateral grip cavity 4 forms a bridge-shaped handle.

The device V shown consists of three separately produced parts, namely, a cup-shaped housing 5, a beaker 6, and a screw cap 7. Housing 5 and beaker 6 consist of HDPE (rigid polyethylene) and the screw cap 7 of PP (polypropylene).

The cup-shaped housing 5 is suspended in the substantially cylindrical hollow 8 of the neck 1, gripping over its edge. The corresponding front edge of the neck 1 is designated 9. An outwardly directed housing rim 10 forms in opposite direction a downwardly open insertion groove 11 which narrows towards the bottom and exerts a sealing and clamping action. The inner annular wall 12 of said insertion groove 11 lifts off from the outer surface of the side wall 13 of the housing 5. It is therefore particularly flexible. The peripheral annular wall 14, on the other hand, rests in sealing manner against the inner wall of the said screw cap 7.

The cover 15 of the screw cap 7 forms the upper closure of an upper chamber I and is clearly spaced axially from the front-edge 9 and housing edge 10.

Below the upper chamber I there is a discharge chamber II. This lower discharge chamber II which is coaxial to the chamber I is separated spaced apart therefrom, but connected for flow, by a partition wall 16 which extends substantially transverse to the longitudinal axis x—x of the device V. The corresponding connection is effected by a laterally located, relatively large passage hole 17 in the region of the annular bottom 18 of the housing 5. There, as can be noted from FIG. 4, the dome-shaped or, more precisely stated, funnel-shaped partition wall 16 is accordingly perforated. The funnel wall, i.e. the partition wall 16, extends at an angle of 45° to the horizontal, for instance to the bottom 18. The passage hole 17 lies on the side of the device facing the grip cavity 4.

The base plane of the frustoconical or dome-shaped partition wall 16 lies on the beaker side; the tapered region of the partition wall, on the other hand, is connected to an upwardly directed outlet tube 20 which is formed simultaneously on the housing 5. Said outlet tube 20 is connected to the partition wall 16 for flow in direct axial alignment or coaxial alignment to the discharge chamber II and for flow communicates via the lower chamber II indirectly with the upper chamber I. Via the outlet tube 20, upon the tilting of the device V into a lowered position, the liquid 3 is dispensed in apportioned amount, namely only upon the second turning over of the device and with approximate retaining of the pouring plane E—E.

A pouring spout 21 of the centrally located outlet tube 20, which spout is of somewhat reduced cross section and is closed by stopper when not in use, extends over the top of the cover 15 of the screw cap 7. The outlet tube 20 passes through a correspondingly centrally located opening 22 in the cover 15. The edge of the opening, which is formed in bead-like manner, lies in this case in sealing fashion against the slightly conically outwardly extending outer wall of the outlet tube 20. This sealing place is designated D1.

The opening 22 lies somewhat above the top of the cover 15 since it is formed on a corresponding protruding socket 23 of the screw cap 7. The greater axial length of the socket 23 extends, however, into the inside of the upper chamber I, closely surrounding the outlet tube 20. About half the length of the outlet tube 20 is covered in this way.

The stopper 24, which is snapped in closing fashion into the pouring spout 21, is seated on a linked band 25. The latter is formed directly via a film-hinge 26 on the top of the screw cover 7 consisting of the softer plastic material (PP). The film hinges present between the links also bear the reference numeral 26. The end link which bears the actual stopper 24, which is formed as a hollow stopper, is continued into a free-standing gripping tab 27.

The pouring spout 21, which protrudes in chimney-like manner, is surrounded by an annular wall 29 which surrounds a drip collector 28 and is pointed in the direction of pouring. The pointed region extends close to the edge of the screw cap 7. It is of triangular contour and at the same time forms a stabilizing rib on the outside of the screw cap.

In the opposite direction, and therefore on the bottom of the cover 15 of the screw cap 7, there is formed in free-standing manner, directed downward, an annular wall 30 which is pointed with a knife edge. Said wall together with the top of the housing edge 10 forms a second sealing point D2 for the upper chamber I.

Figure 8:
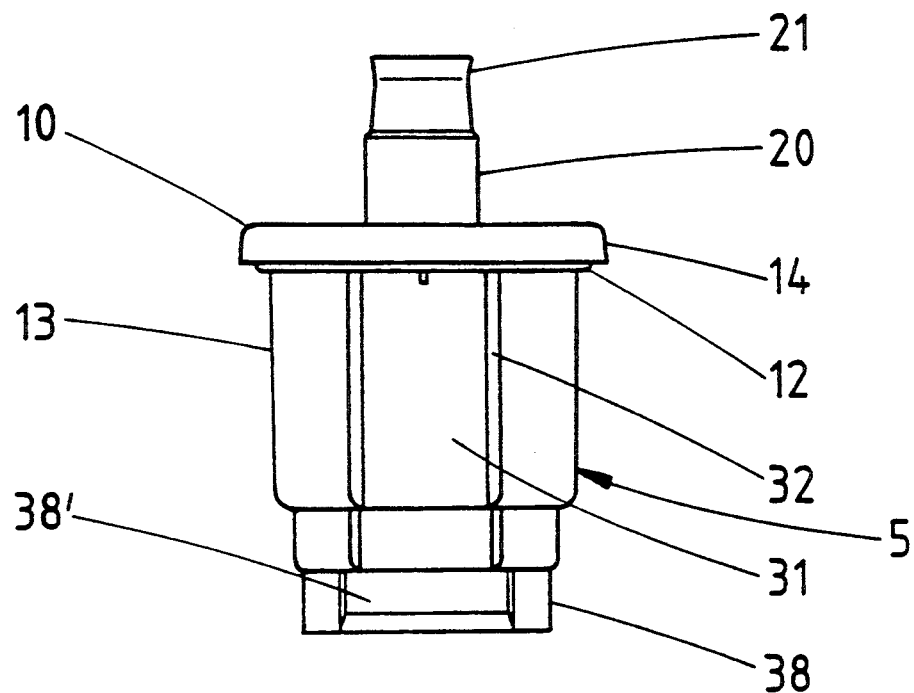
FIG. 8 is a front view of the cup-shaped housing.
Figure 9:
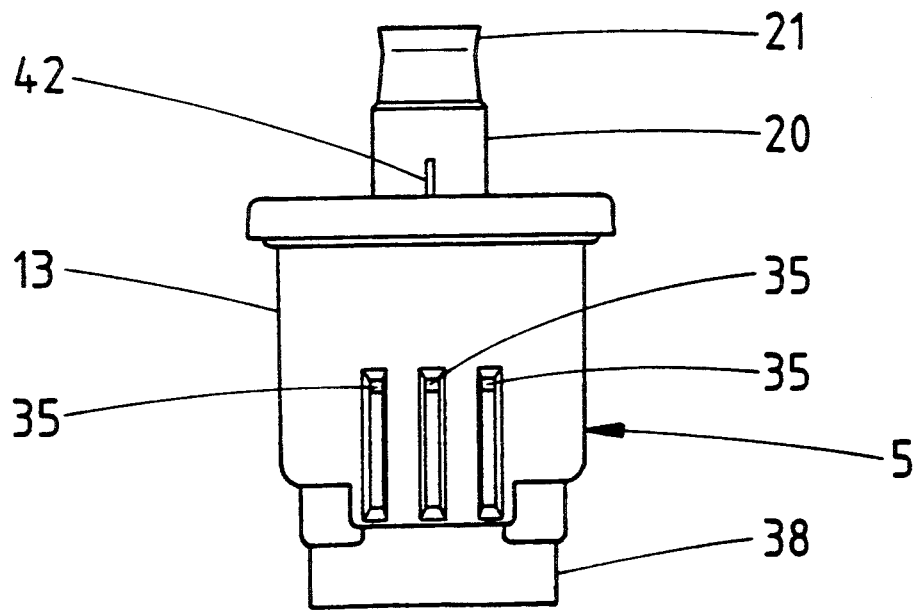
FIG. 9 is a rear view of the cup-shaped housing.

A feed channel 31 permits the liquid 3 to enter into the inside of the device V upon turning over the device V on the storage container 2. The feed channel 31 is formed by a longitudinally inwardly directed bulge 32 of the side wall 13 of the upper chamber I. The inwardly directed bulge 32 can be noted particularly clearly in FIGS. 6 and 8. It results in a partial annular-chamber constriction for the chamber I, namely on the side of the housing 5 facing away from the passage hole 17. The peripheral limitation of the feed channel 31 in this connection is formed by the neck 1 and its cavity 8. To be sure, as a result of the annular wall 12, the side wall 13 need not rest in contact with the corresponding inner wall of the cavity 8 so that the axially oriented feed channel 31 still has a feed region which acts in the manner of an annular chamber.

On top, i.e. on the screw-cap side, the feed channel 31 passes into feed openings 33 formed by openings in the housing edge 10, which openings are separated by an axially and radially aligned partition wall 34. The latter at the same time forms a bridge of material between the bulge 32 and the stable edge 10. The partition wall extends outward in wedge shape at about the height of the lower edge of the annular wall 12 on the side wall 13. The feed openings 33 form a slot which extends over 60°; the partition wall 34 extends in the pouring plane E—E.

Diametrically opposite the feed openings 33, vent holes 35 are present in the side wall 13 of the upper chamber I. These are small window-like openings which can easily be produced upon molding or injection by wall offset, i.e. without transverse pusher. As a whole, three such vent holes 35 are provided, lying alongside of each other. They lie on a horizontal plane, also distributed over an angular region of about 60°. The central vent opening 35 extends in the pouring plane E—E. Viewed three-dimensionally, they extend approximately at the mid-height of the side wall 13 of the upper chamber I. The equally spaced outer vent holes are aligned approximately with the edge 17' of the slit-shaped passage hole 17 lying on the same side.

The beaker 6, which forms the discharge chamber II, is attached by a detachable detent connection with the housing 5. For this purpose, it has a continuously surrounding detent rib 36 arranged on its outer wall. The housing-side flank of the rib comes against an annular shoulder 37 formed by the bottom 18. Over the annular shoulder 37 there furthermore extends a skirt-like downwardly directed projection 38. The inner edge of the latter is beveled so that a sort of collection funnel 39 with centering action is present which directs the edge of the beaker into the correct position for the detent attachment. On the inside of the skirt-like projection which is on the feed channel side but with open gap, there are two or three counterdetent ribs 40. The detent rib 36 extends over them, the detent attachment resulting relatively easily as a result of the axial interruption 38' of the projection 38, which is formed as an annular wall.

The edge of the beaker 6 terminates in the same plane as the top of the bottom 18.

In order to assure the proper functional alignment of the screw cap 7 with the housing 5, the socket 23 of the screw cap 7 which forms the sealing place D1 is further developed in the manner that it forms an orientation recess 41 into which an orientation projection 42 which extends over the entire length of the outlet tube 20 engages in formfitting manner. The orientation recess is a slot which extends from the lower free end of the socket 23 up to in front of the bottom of the cover 15, into which slot the orientation projection 42, shaped in the form of an orientation tongue, enters, securing the two parts against rotational displacement with respect to each other. The lower end of the slot can be of delta shape; the upper end of the orientation projection can be shaped with the formation of a run-on bevel, as can be noted from FIG. 4.

Figure 2:
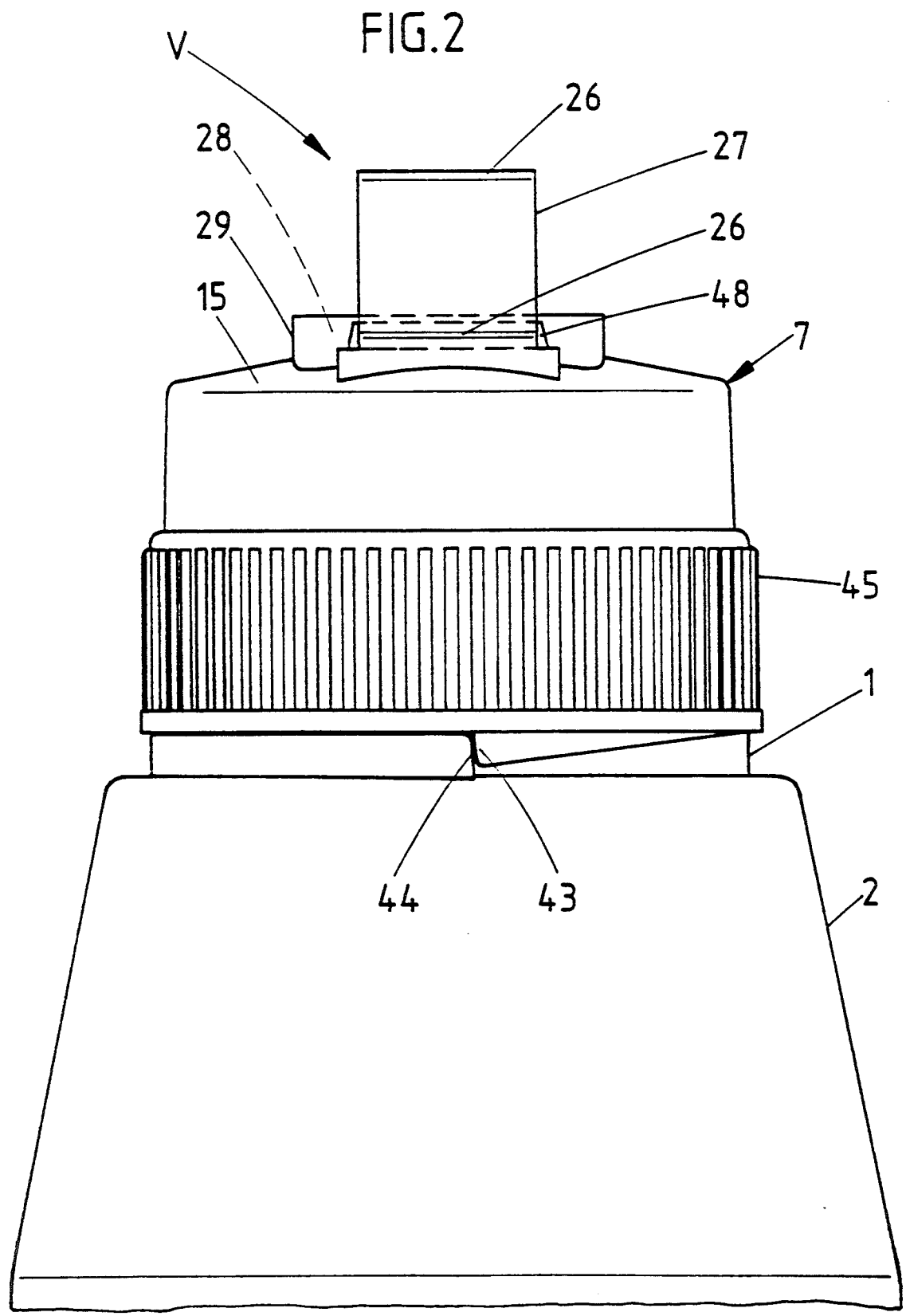
FIG. 2 is a view in the direction of the arrow A in FIG. 1, on a larger scale.
Figure 3:
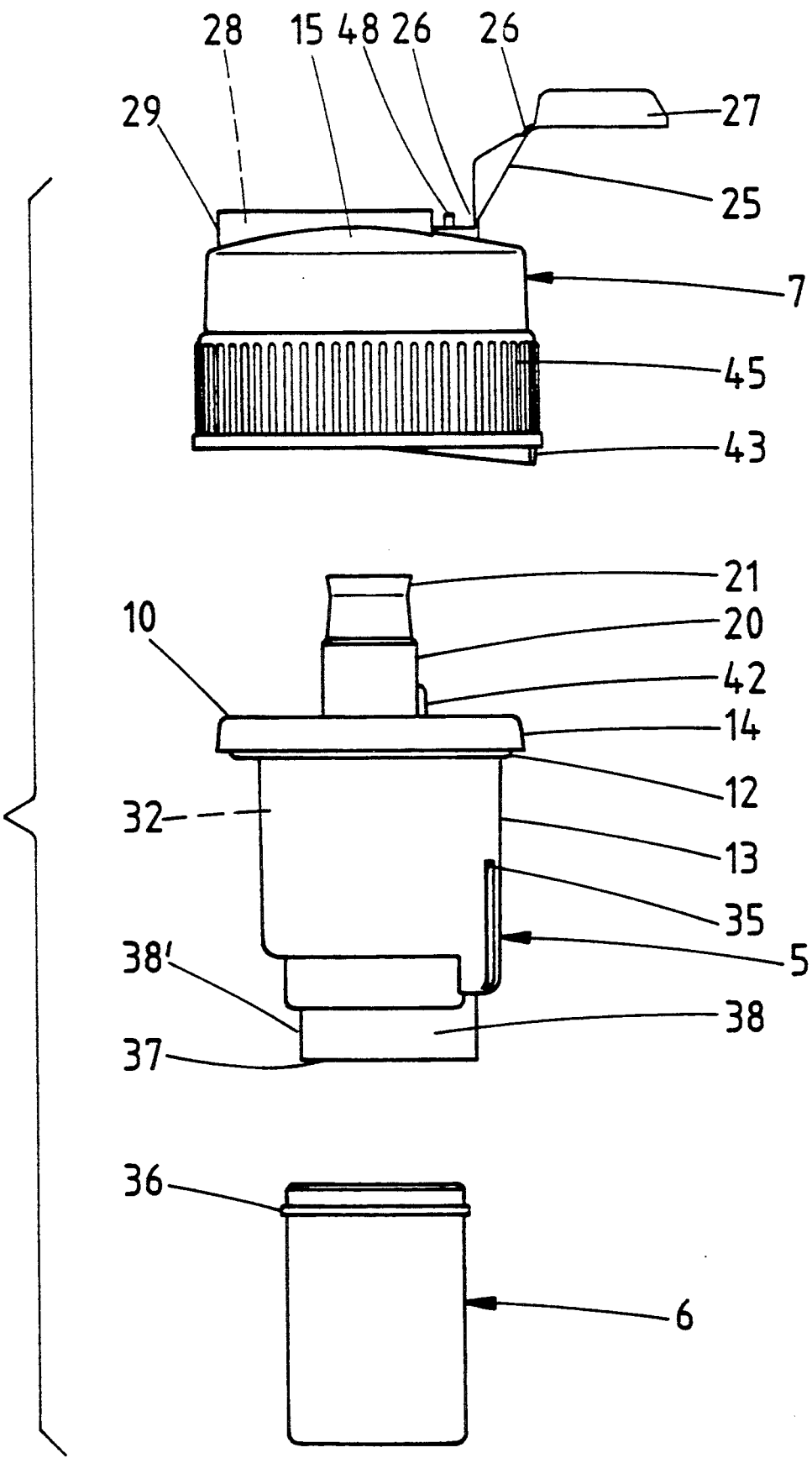
FIG. 3 is an exploded view of the device, consisting of three basic parts.

In order to effect complete orientation also with respect to the storage container 2, the screw cap 7, as can be noted from FIG. 2, forms a stop tap 43 which furthermore extends over the lower edge of the cap and in final position of rotation comes against a fixed vertical step 44 on the foot of the neck 1.

For the application of sufficiently high screwing forces, the region of the screw cap 7 which is developed in the form of a bell edge is roughened, in particular longitudinally grooved. The grooves bear the reference numeral 45. The correspondingly developed section of the wall is used, on the inside of the screw cap, to form an internal thread 46 which cooperates with a corresponding external thread 47 of the neck 1.

The function of the device described is as follows: The storage container 2 provided with the device V of the invention is brought, after pulling the cover-like stopper 24 into the tilted position shown in FIG. 5, into such a position that the outlet tube 20 points clearly downward (for instance at a 45. angle of inclination). In this connection, liquid 3 flows over the feed channel 31, passing through the feed opening 33, into the so-called upper chamber I. This chamber is flooded in an instant. The pressure equalization in the upper chamber I takes place in this connection via the vent holes 35. The upper edge of these vent holes 35 also limits the amount of filling (see the level Sp shown in FIG. 5) within the device V.

Figure 4:
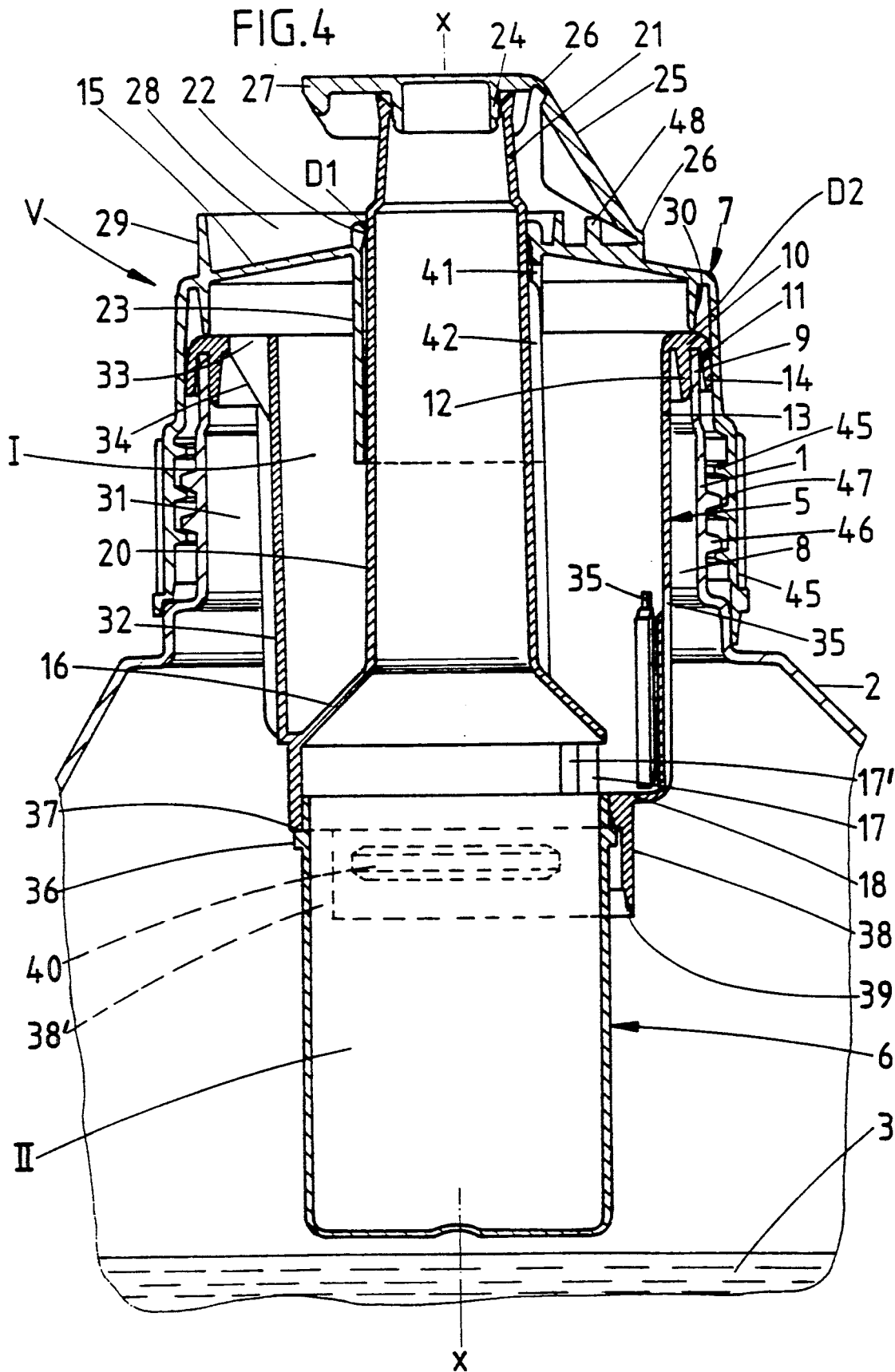
FIG. 4 is a vertical section through the assembled device with the section lying in the tilting plane.

After this first tilting into the lowered position, the device V is again placed in the upright position shown in FIG. 4. In this normal standing position, the liquid 3 which has entered into the upper chamber I passes via the passage hole 17 into the discharge chamber II. Excess liquid 3 moves out of the upper chamber I through the vent holes 35 into the remaining supply of liquid 3.

Figure 5:
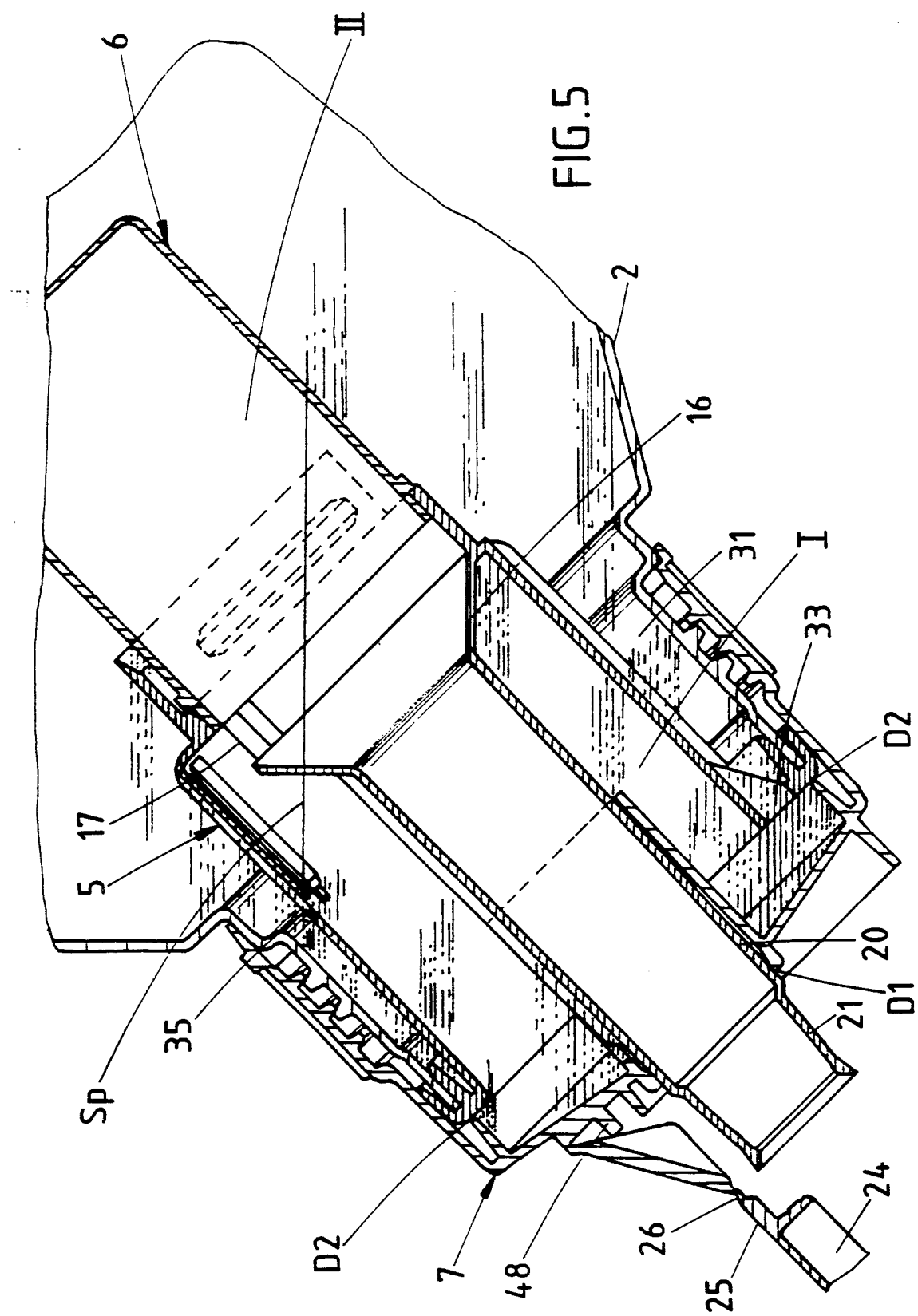
FIG. 5 shows a device in the tilted discharge position with indication of the flooding situation.

The device V or the storage container 2 is now again brought into the tilted position shown in FIG. 5. In this connection, the dosed amount of liquid which has entered into the discharge chamber II is discharged through the central outlet tube 20. Since the corresponding tilting movement is restricted in direction, the liquid cannot slosh out via the passage hole 17 at the top. The dome-like or frustoconical funnel shape of the partition wall 16 acts as a baffle plate.

If the delivery is to be effected undosed or with the use of a narrow jet stream through the outlet tube 20, the beaker 6 need merely be withdrawn from the device V. The liquid then passes out directly without traveling through a z-shaped channel.

However, in this case also a residue-free delivery can be effected if the beaker 6 is again placed on during the final phase.

A stop ledge 46, which lies in the region of the film hinge 26 which is near the cap, results in a defined swing stop for the link band 25, in particular its end link, which bears the stopper 24.

The features of the invention disclosed in the above specification, drawing and claims can be of importance both individually and in any desired combination for the invention.

I claim:

1. In a device, comprising an outlet tube, for apportioned delivery of liquid from a storage container through the outlet tube, the delivery taking place only upon a second turning over of the device, the device further comprising a cup-shaped housing divided by a partition wall into an upper chamber of said housing and a lower discharge chamber, the partition wall forming a bottom of the upper chamber, the discharge chamber and upper chamber of said housing communicating with each other by a passage hole, and a feed opening in the upper chamber, the outlet tube debouching above the partition wall in an upright position of the device, the improvement wherein said outlet tube is attached to the upper chamber in the region of the bottom of the upper chamber and is spaced above said lower discharge chamber, and detent means for connecting said lower discharge chamber to said upper chamber in a plane below the attachment of the outlet tube to the upper chamber in the upright position of the device.

2. A device according to claim 1, wherein said outlet tube is formed in one piece with the upper chamber.

3. A device according to claim 1, wherein
said cup-shaped housing comprises a side wall of the upper chamber, and
vent holes are formed in said side wall.

4. A device according to claim 3, wherein
said vent holes are formed approximately at mid-height of the side wall of the upper chamber.

5. A device according to claim 3, wherein
three of said vent holes are located alongside of each other.

6. A device according to claim 1, wherein
said cup-shaped housing comprises a side wall of the upper chamber, and
a feed channel extends to said feed opening communicating with said upper chamber, said feed channel is formed by an inward bulging of said side wall of the upper chamber and a neck of the storage container.

7. A device according to claim 6, wherein
said feed opening debouches in a plane which is formed by an upper edge of the upper chamber.

8. A device according to claim 1, further comprising
a screw cap comprising a cover of the upper chamber, said screw cap is traversed in sealing manner by said outlet tube extending through an opening in said cover.

9. A device according to claim 8, further comprising
an orientation projection on the outlet tube cooperating with an orientation recess in the screw cap.

10. A device according to claim 9, wherein
the orientation projection is an axially extending orientation tongue.

11. A device according to claim 1, wherein
the partition wall has a funnel shape and is connected at its tapered region to said outlet tube.

12. A device according to claim 1, wherein
said outlet tube is connected at its bottom to said partition wall.

* * * * *